Figure 1:
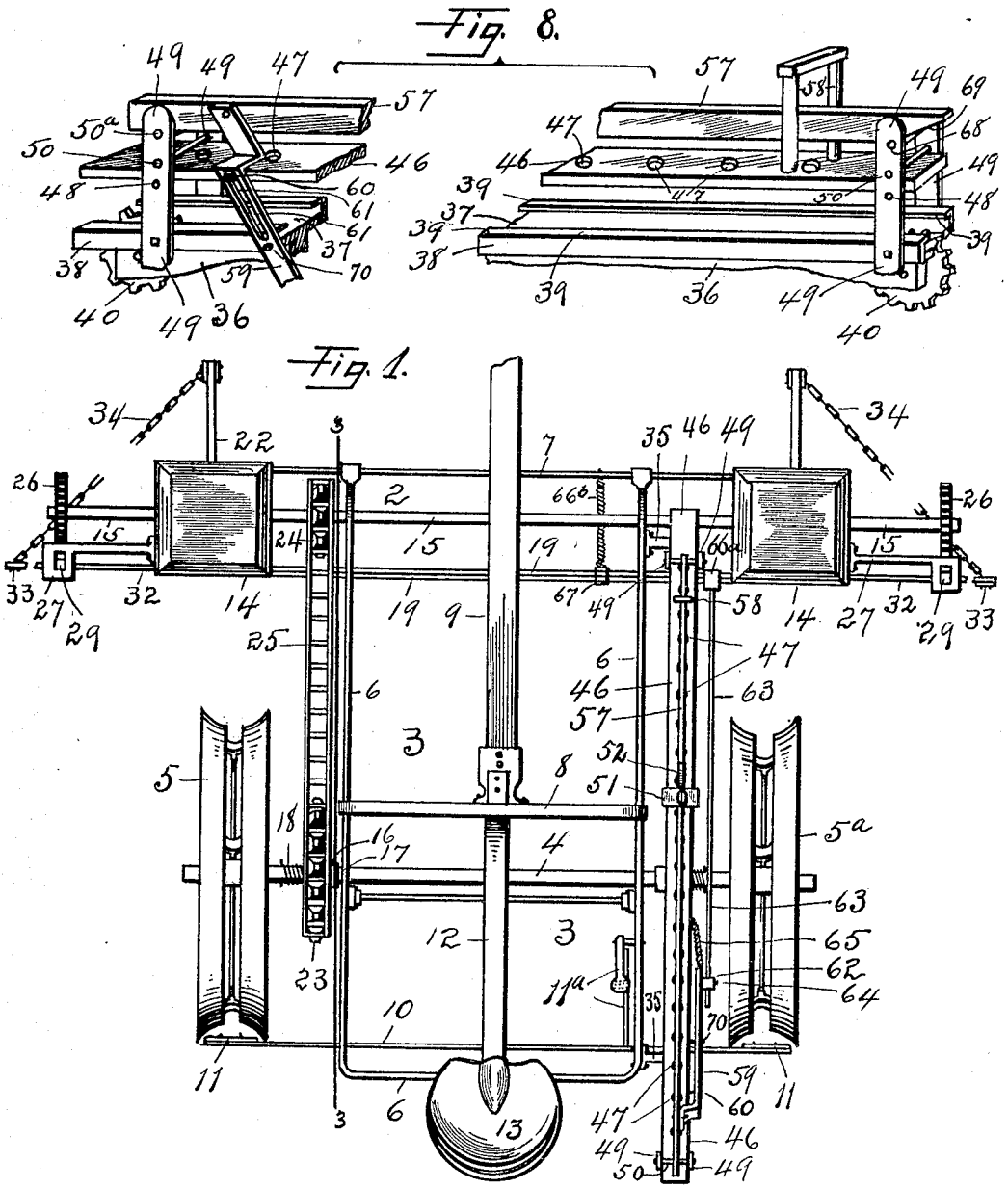

W. H. LUCAN.
CORN PLANTER AND MARKER.
APPLICATION FILED JAN. 25, 1908.

904,271.

Patented Nov. 17, 1908.

4 SHEETS—SHEET 1.

W. H. LUCAN.
CORN PLANTER AND MARKER.
APPLICATION FILED JAN. 25, 1908.

904,271.

Patented Nov. 17, 1908.

WITNESSES:

INVENTOR.

BY

ATTORNEY.

W. H. LUCAN.
CORN PLANTER AND MARKER.
APPLICATION FILED JAN. 25, 1908.
904,271.
Patented Nov. 17, 1908.
4 SHEETS—SHEET 3.
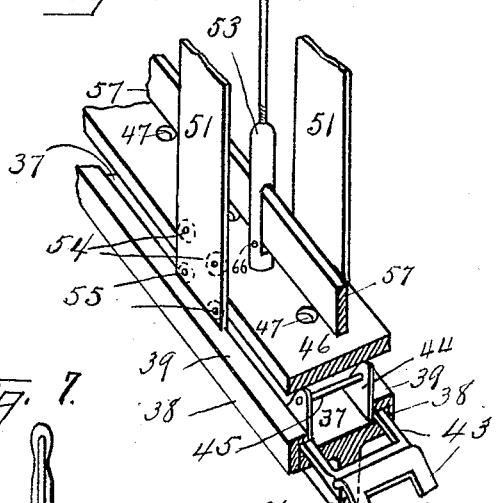
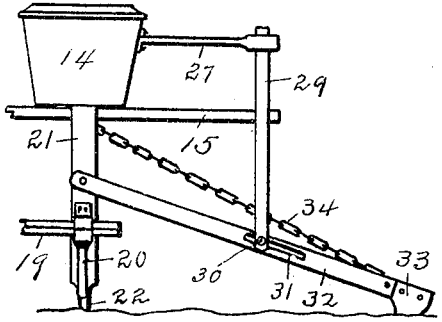
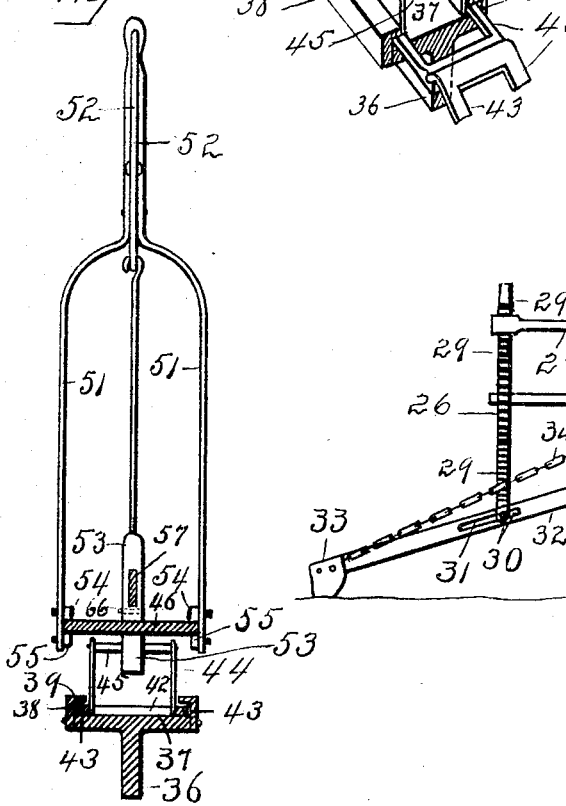
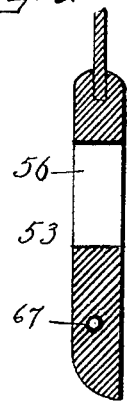
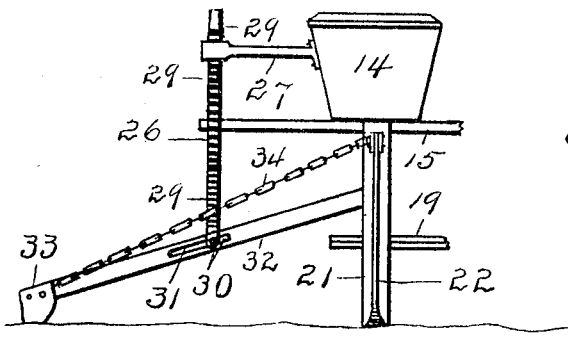

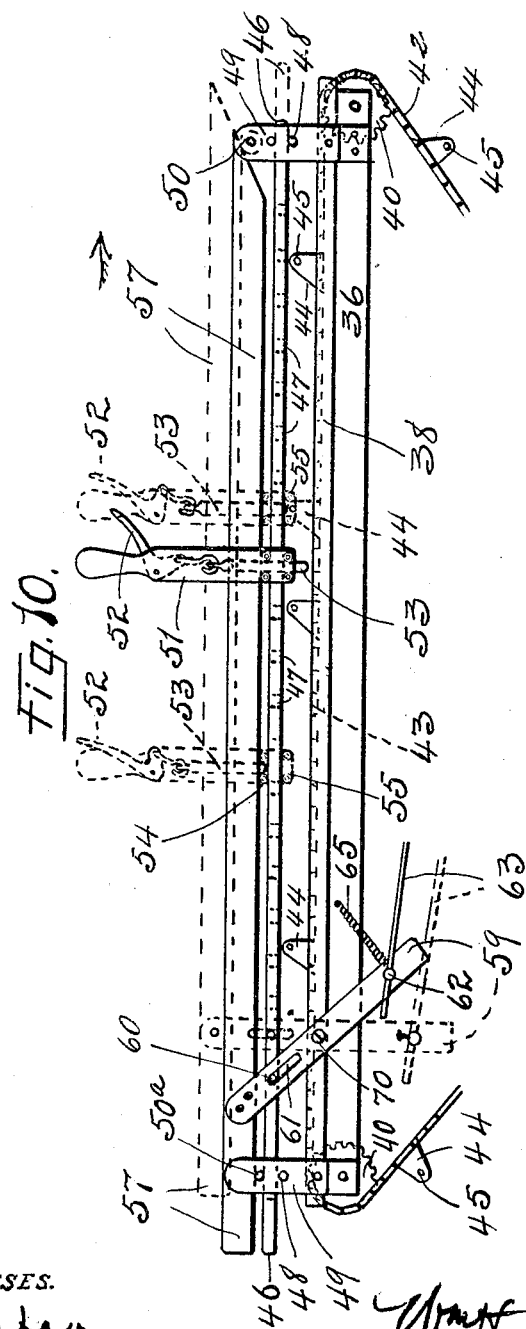

UNITED STATES PATENT OFFICE.

WILLIAM H. LUCAN, OF HERMON, ILLINOIS.

CORN-PLANTER AND MARKER.

No. 904,271.

Specification of Letters Patent.

Patented Nov. 17, 1908.

Application filed January 25, 1908. Serial No. 412,579.

*To all whom it may concern:*

Be it known that I, WILLIAM H. LUCAN, a citizen of the United States, and a resident of Hermon, in the county of Knox and State of Illinois, have invented a new and useful Corn-Planter and Marker, of which the following is a specification.

The invention relates to corn planters of that type or class in which the seeding mechanism is actuated by means of mechanism interposed between it and the supporting wheels of the planter, which wheels derive their power from their friction with the ground, and deposit the seed in check rows without the aid of a check-row line or other extraneous appliance. As is well known to those familiar with the art of agriculture, this could readily be accomplished were the fields to be planted level and the soil equable as to texture, organization and condition. Inasmuch, however, as most fields are neither level nor uniform, are furrowed, stony, on hillsides or inclined from the horizontal, are in some places moist while in others dry, are variously loamy, sandy or of clay, no device which has come under my observation has contained such mechanical features as would enable the operator to plant an ordinary field in true check-rows.

To provide a planter which will successfully operate in fields of the above recited natures constitutes the primary object of my invention.

I am aware that means have been provided whereby the operator could adjust the movements of the dropping-mechanism, whereby provision was made for advancing or retarding said movements, but so far as my knowledge extends this operation has been generally, if not universally, attended by stopping the movement of the draft animals and thereby the planter, consequenting a loss of time, and the time when corn planting is done, time is an essential factor.

A further object of the invention is, therefore, to provide means whereby such last recited timing or regulation of deposit of the seed may be made by the driver without dismounting and without any loss of time whatever. And while I am moreover aware that automatic marking of the hills to be planted has been accomplished, another object of the invention rests in the production of a simple and efficient means for automatically reciprocating the markers, but without rotating them, whereby they will indicate the desired place of deposit of the charge of seed in the next succeeding rows as the planter makes its bout across the field, mechanical means being utilized to elevate them, but they being adapted to fall by their own gravity and to "mark" simultaneously with the discharge and deposit of the seed.

Subsidiary objects will appear as the nature of the invention is disclosed.

With these ends and objects in view my invention consists in mechanism which may be attached to any of the well known or standard types of corn planters, to actuate the dropper mechanism at either uniform or non-uniform distances in the travel of the machine and to compensate for inequalities of the ground.

The novel means employed in carrying out the objects of my invention are hereinafter described and made the subject matter of claims hereto appended.

A preferred construction of parts and the arrangement thereof are illustrated in the accompanying drawings, in which:

Figure 1 is a top plan of a planter embodying my improvements, some of the unessential parts not being shown, and the marker bars and chains partly broken away; Fig. 2, a side elevation; Fig. 3, an elevation in the line 3—3 in Fig. 1; Fig. 4, a rear elevation of the right hand side of the forward section; Fig. 5, a front elevation of the same; Fig. 6, a perspective, a fragmental detail of the spacing mechanism; Fig. 7, a detail, a front elevation, partly in section; Fig. 8, a perspective, a fragmental detail, partly broken away; Fig. 9, a sectional detail of the spacing pin, and Fig. 10, a detail, greatly enlarged, a side elevation of the spacing-plate, latch-bar, spacing-pin and lever by which it is manually operated, chainway, fingered actuating chain, and other parts of the actuating mechanism, the guides 58 being here omitted.

Attention being now directed to said drawings by numerals, the same one indicating the same part in the different figures thereof, 2 represents the forward and 3 the rear frame or section of a two-row corn planter which may be of any suitable construction. To the axle or shaft 4 one supporting or traction wheel 5 is keyed or otherwise fixed, to actuate said axle. The other wheel, 5ª, is preferably left free to rotate on the axle, but may be fixed thereto and the drive chain and other actuating mechanism be duplicated. 6 indicates the rear-frame-bars; 7, the transverse bar of the forward frame; 8, the transverse or coupling bar of the rear frame, (the hand lever for raising and lowering the runners which is generally fixed thereto not shown, as it is unessential to the operation of my invention,); 9, the tongue; 10 and 11 respectively, the scraper bar and scrapers; 11ª, the foot-lever mechanism for operating them; 12 and 13 respectively, the seat and the seat-supporting bar; 14, the seed-boxes; 15, the rotary shaft which actuates the seeding mechanism (and in my improvements, the markers); 16 and 17, clutch members for throwing the driving sprocket into or out of engagement with the axle; 18, the springs which hold the clutch members in engagement; 19, the rock-shaft which actuates the lower valve 20 in the seed-tube or leg 21; and 22, the runners or furrow opener. These are parts of an ordinary corn planter check-rower, may be of any suitable construction and assemblage, and do not constitute any part of my invention except as they sustain, carry, or actuate it.

I have not illustrated nor described any specific mechanism in the seed-boxes, as such constitutes no feature of the invention and may be of any suitable nature. Other parts which ordinarily enter into the construction of a corn planter are also omitted for the same reason and to avoid confusion.

Feathered or splined to the axle 4 is a driving sprocket 23 which imparts movement to a similar but smaller one 24 fixed on the shaft 15, a chain 25 embracing them in a well known manner. The last recited shaft extends past the seed-boxes and at each end carries a multilated pinion 26 which is fixed thereto. Fixed by a bracket 27 to the outer side of each seed-box is a rack-bar 29 which is provided at its lower end with a pin or stud 30 which projects through a slot 31 in a marker bar 32 pivoted at its inner end to the planter leg and its free end provided with a spade-like marker 33. A stay-chain 34 is fixed at one end to the marker bar and at its other end to the front of the runner. Fixed to, near the front and rear portions of one of the longitudinal rear-frame bars 6 are bracket arms 35, to the upper ends of which is fixed the web 36 of a chainway comprising a bed 37, sides 38 and overlying guide flanges 39. At each end of the chainway an idler sprocket 40 is journaled. A sprocket 41 is splined on the shaft 4 and a chain 42 embraces it and the idlers 40 and traverses said way. Each link of the chain is flanged at its sides 43 so that it is securely held within said way as presently described. A portion of the links are provided with tripping fingers comprising upright side portions 44 connected by a roller 45, these fingered links being spaced the same distance as is the distance between the respective rows of corn. An adjusting or spacing-plate 46 provided with a lineal series of perforations 47 is supported on rollers 48 journaled in standards 49 bolted to each side and at each end of the guideway. Other rollers, 50, are journaled slightly above the rollers 48 in said standards, and said rollers 48 and 50 permit of free endwise movement of the spacing plate therebetween, which movement will presently be described. The plates 51 of a frame in which is mounted a latch-lever 52, to the weight arm of which is secured a spacing-pin 53 lie at each side of the spacing bar and are provided with rollers 54, 55 above and below it, to facilitate longitudinal movement of the frame thereon to adjust the pin for earlier or later contacts by the fingers of the chain to actuate the spacing plate. The pin is beveled off at its rear edge and is provided with a slot 56 in which rides the median portion of a latch bar 57, the rear end of which normally rests on a roller 50ª, its midlength on a roller 66 journaled in bearings transversely of said pin, and its free forward end lies between guides 58 rising from the spacing-plate. Near its rear end the latch-bar is fixed to the upper end of a lever 59 fulcrumed on one of the sides 38 (or to the web 36 if preferred,) by a boss 70 thereon. This lever is provided with a longitudinal slot 61 through which projects a boss 60 extending from the outer edge of the spacing plate. A stub 62 is movably seated in a bearing near the lower end of the lever 59 and has a radial aperture through which is passed one end of a link or connecting rod 63, the other end of which is threaded into a bent lever 66ª on the shaft 19 as shown best at Fig. 1.

Adjustments of the link may be effected by means of a set-screw 64 threaded into the stub 62. A retractile spring 65 is fixed at one end to the web 36 and its other end to the lever 59. A similar spring 66ᵇ is connected at its forward end to the bar 7 and its rear end to an arm 67 depending from the rock shaft. The functions of these springs will be disclosed in the description of the operation of the device.

The operation will be best understood by reference to Fig. 10, in which the spacing-pin and its coacting parts are shown by full lines as in position for operation by contact of a finger-roller 45. In the forward dot-line position the frame is shown as having been manually thrown one space (in the spacing-plate) forward and the latch 52 not yet released. It will be evident that the roller 45 would not here so soon contact the pin 53 if it (the latter) were released, and that the seeding mechanism would therefore release a charge somewhat forwardly. In the rear dot-line position the pin is shown as having been manually raised by means of the latch-lever mechanism, and to be resting on one of the spaces between the apertures 47, in which the chain will travel without actuating the seeding mechanism.

In order that accurate "checking" of the entire field be accomplished, it is well to prepare the ground for the first trip of the planter across the field by careful harrowing. Let it be supposed that one such trip has been made, and that the return one is about to be made. As the wheel 5ª revolves it will impart its direction of movement to the sprockets 23 and 41. The former will, through the medium of the chain 25 impart like movement to the sprocket 24, thence to the rotary shaft 15, which latter actuates the seeding mechanism (not shown) in the hoppers, and to the mutilated pinion 26. It will be evident that the cogs on said pinion should be "timed" with the aforesaid seeding mechanism. The operation of said mechanism in dropping a charge of seed onto the lower valve in the seed-tube is too well known to require description.

The wheel 41 actuates the chain 42 which traverses it, that portion or flight thereof which is traversing the bed 37 moving in the same direction as does the planter. When one of the fingers 45 strikes the beveled point of the pin 53, which point projects through one of the apertures 47 in the spacing-plate, it will carry said plate and thereby the latch-bar 57 forwardly with it until the beveled point 69 of the latter (see Figs. 2 and 8) slides up onto the roller 68 at the top of the standards 49 as shown by dot lines at Fig. 2. The latch, being extended through the slot 56 in the pin 53, will thereby raise the latter and permit the roller 45 of the chain fingers to be freed from its engagement with said pin, but not until the last described forward movement of the spacing-plate has drawn the upper end of the lever 59 forwardly to raise the rear end of the latch-bar and to draw the link 63 rearwardly to open the lower valve 30 and permit the seed to fall therefrom and be deposited in the ground. This movement is preferably timed simultaneously with the movement of the seed-plates in the hoppers; it must be timed, to insure true "checking", with that of the markers. The shaft 15 which actuates the upper valve actuates also the mutilated pinion. As the latter revolves the cogs thereof will engage those of the rack-bar 29 to raise it to an approximately horizontal position. When the pinion has revolved to such extent that the smooth portion of its perimeter frees the rack-bar it (the latter) will, by its own gravity and by that of the marker, drop to the ground, digging, (by the movement of the planter), a mark for the place of deposit in the next succeeding row. These indicated spots will be evident to the driver, as will also the place of deposit of the seed being dropped. If the planter has for any cause gained, or in other words, has deposited a charge in advance of the mark, the driver will operate the lever 52 to raise the point of the pin 53 entirely above the spacing-plate, draw the frame and thereby the pin rearwardly to the extent desired, release the latch-lever and permit the pin to enter the proper aperture 47 in the spacing-plate. This selective positioning of the pin will bring it closer to the next approaching fingered link of the chain 42, and cause the spacing-plate, latch-bar, lever 59 and link 63 to operate the lower valve 30 somewhat earlier and to bring the rows again into alinement. If the lower valve is dropping behind time, an advance of the pin as last described and to the extent necessary, will again bring the rows into proper formation. The springs 65 and 66ᵇ will contract upon the tension being released by the act of the chain fingers freeing themselves from the pin, and thereby return the parts which combine to operate the lower valve to their normal positions, ready for another action by the next approaching finger or tappet. The mechanism for actuating the lower valve may be thrown out of gear by raising the pin 53 above the spacing bar and resting it on one of the divisions between the apertures 47. In this position the rollers of the fingered links will pass freely thereunder and without action thereon to actuate said mechanism.

As I have hereinbefore stated, it has not been thought necessary or best to encumber this specification and the accompanying drawings with descriptions and illustrations of such parts as are neither necessary nor form any part of the invention herein claimed. Any suitable clutch mechanism may be provided for throwing the driving sprockets into or out of engagement with the axle, and other means than that shown may be provided for elevating the markers and for releasing them at such time that they will fall by their own gravity simultaneously with the operation of the lower valve. In fact, it is apparent that numerous changes may be made in the details of construction and by modifications involving only mechanical skill, without departing from the essential spirit and scope of my invention.

I do not, therefore, desire to be understood as limiting my claims to specific constructions nor to particularities, but claim as new:

1. In a planter, in combination with the seeding mechanism a spacing-bar provided with apertures, a frame movable on said bar, and a pin mounted therein adapted for selective engagements with said apertures, and means for actuating said pin.

2. In a planter, in combination, a sprocket chain including fingered links, a spacing-plate provided with apertures, and means adapted for selective engagements with said apertures and to be periodically engaged by said links.

3. In a planter, in combination, a sprocket chain including fingered links, a spacing-plate provided with apertures, means adapted for selective engagements therewith and to be actuated by said links, and means whereby said means is periodically released from such engagements.

4. In a planter, in combination with the wheels, axle and forward section thereof, a movable spacing-plate, a lever connected thereto and to the lower valve of said forward frame, means adapted for selective engagements with said plate, traveling means adapted to impart movement to said means, and means whereby said first named means may be freed from engagement with said traveling means.

5. In a planter, in combination, an axle, a sprocket chain driven thereby, a rotary shaft adapted to actuate the seed-plates, means actuated by said sprocket for imparting rotary motion to said shaft, a marker, means interposed between it and said shaft whereby it may be periodically raised, a second sprocket driven by the axle, a chain traversing it and including tripping means, a spacing-plate adapted to actuate the lower valves in the seed-tubes, and means adapted for selective engagements with said plate for retarding or advancing the action of the lower valve.

6. In a planter, mechanism for advancing or retarding the deposit of charges of seed, including a plate provided with adjusting means, means adapted for selective engagements therewith and to impart movement thereto in one direction, and means for returning said bar to its normal position after each of such movements.

7. In a planter, mechanism comprising a chainway, a chain including fingered links adapted to traverse it, a plate provided with apertures surmounting said links, a pin provided with a slot, it being adapted for selective engagements with said apertures, a latch-bar threaded through said slot, means for raising its ends, whereby said pin is elevated, and a lever fulcrumed on the chainway, fixed to the latch-bar and slidably connected with the plate.

8. In a planter, a shaft, means actuated by a traction wheel for imparting rotary motion thereto, means actuated by said shaft for imparting movement to the seeding mechanism in the hoppers, markers adapted to be actuated by said shaft and to have vertically reciprocating movements, a fingered chain, a spacing-plate, and means adapted for selective engagements therewith, whereby the valves in the seed-tube are actuated simultaneously with those in the hoppers and with the downward movement of the markers.

9. In a planter, mechanism comprising a chainway, a fingered chain adapted to traverse it, means for actuating the chain, a spacing-plate sustained above the chainway and provided with apertures, a frame adapted for movement with relation thereto, a slotted pin mounted therein and adapted for selective engagements with said apertures, a slotted lever fulcrumed on the chainway, a latch-bar fixed to its upper end and extended through the slot in the pin, means for elevating one end of the latch-bar and thereby the pin, means for movably connecting said lever and spacing-plate, whereby the former derives motion from the latter, means actuated by the free end of said lever for actuating the lower valve of the planter in one direction, and means for returning said parts to their normal positions.

10. In a planter, mechanism comprising a chainway, a fingered chain traversing it, means for actuating the chain, a spacing-plate sustained above the chainway and provided with apertures, a frame adapted for movement with relation to the plate, a pin carried thereby and adapted for selective engagements with said apertures, a lever fulcrumed on the chainway, its median portion engaged with said plate, and a link secured to the free end of the lever and its other end adapted to actuate the lower valve of the planter.

11. In a planter, mechanism comprising a chainway, a fingered chain traversing it, means for actuating the chain, a spacing-plate sustained above the chainway and provided with apertures, a frame adapted for movement with relation to the plate, a pin carried thereby and adapted for selective engagements with said apertures and to rest on the divisions between them, a lever fulcrumed on the chainway, its median portion engaged with the spacing-plate, and a link secured to the free end of the lever and its other end adapted to actuate the lower valve of the planter.

12. In combination with the traction wheels, frames, axle and seeding mechanism of a planter, a rotary shaft adapted to derive movement from said axle and to transmit it to the seed-plates in the hoppers, a marker actuated by said shaft, a spacing-plate, means adapted for selective engagements therewith to actuate it, means actuated by the axle to impart movement in one direction to said last named means, and means interposed between the lower valve in the seed-tube and said plate for actuating the former.

WILLIAM H. LUCAN.

Witnesses:
H. M. RICHARDS,
L. M. RICHARDS.